March 19, 1935.                R. F. KOHR                1,994,823
                                 BRAKE
                          Filed June 30, 1930           2 Sheets-Sheet 1
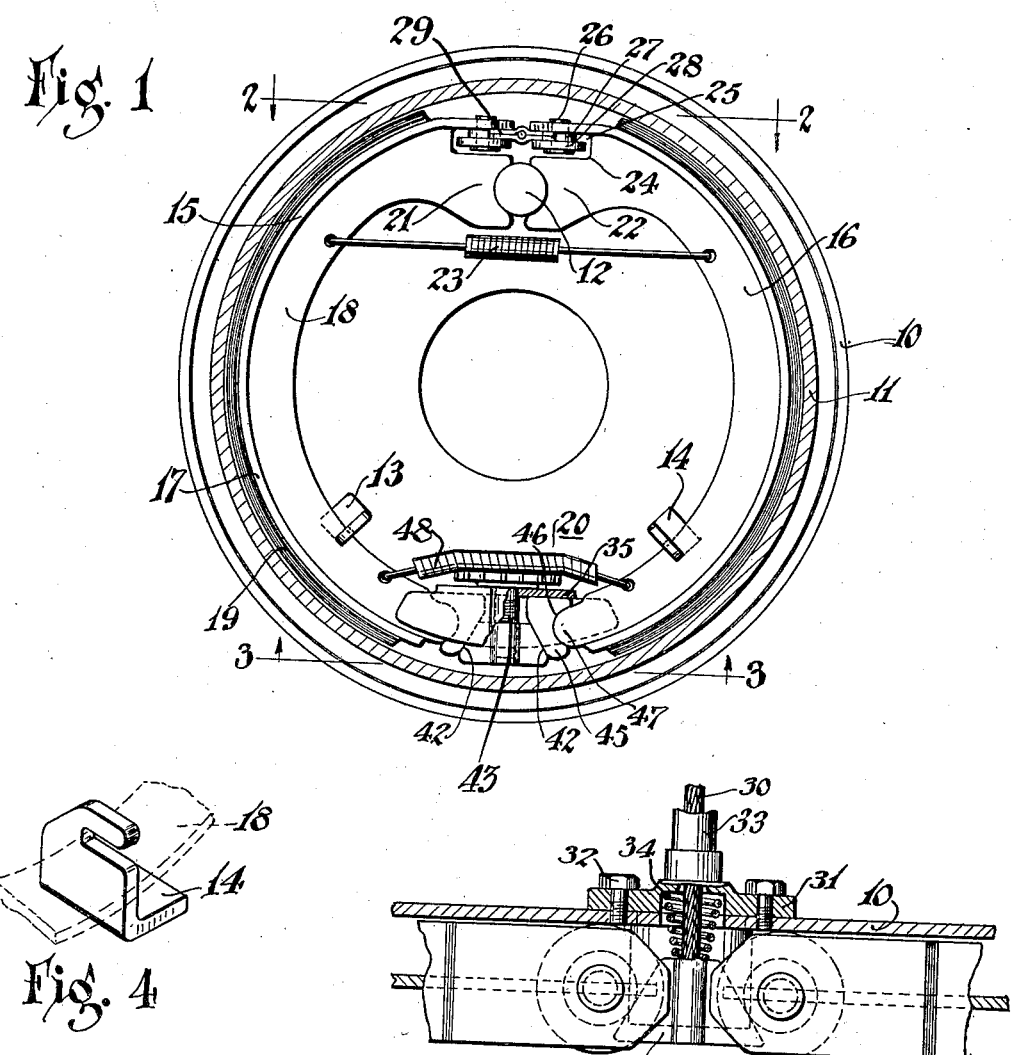
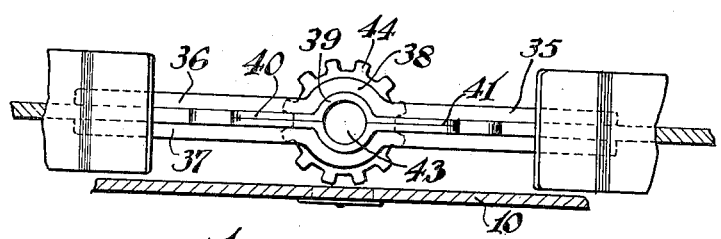
INVENTOR.
Robert F. Kohr
BY
M. W. McConkey
ATTORNEY.

March 19, 1935.  R. F. KOHR  1,994,823
BRAKE
Filed June 30, 1930   2 Sheets-Sheet 2
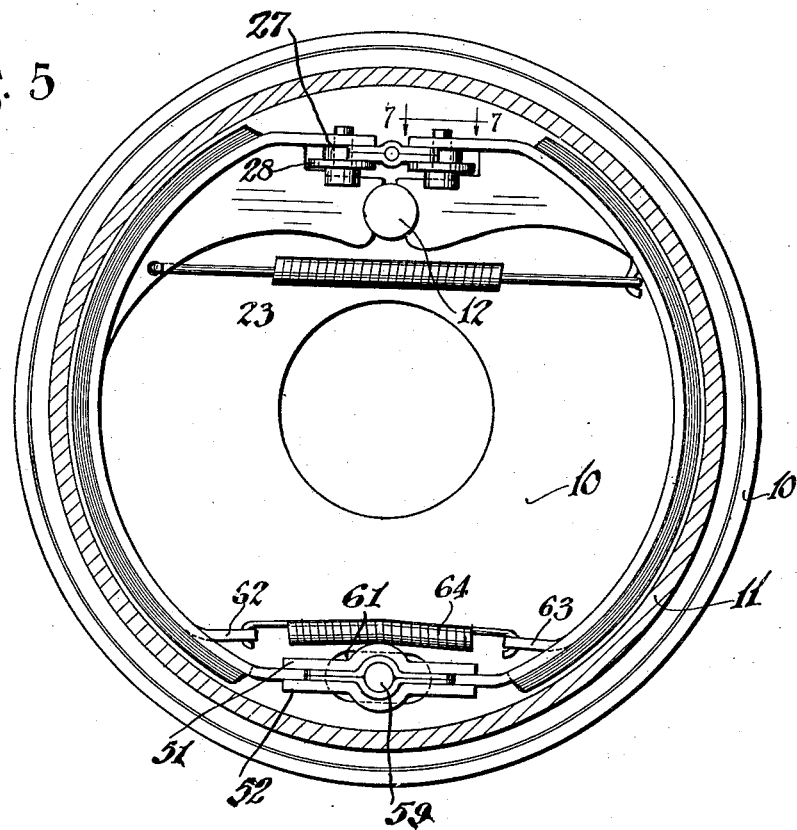
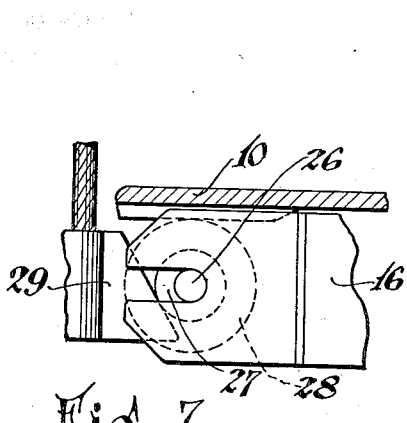
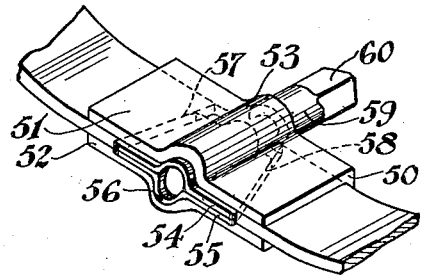
INVENTOR.
Robert F. Kohr
BY
ATTORNEY Patented Mar. 19, 1935

1,994,823

UNITED STATES PATENT OFFICE 1,994,823

BRAKE

Robert F. Kohr, South Bend, Ind., assignor to Bendix Brake Company, South Bend, Ind., a corporation of Illinois Application June 30, 1930, Serial No. 464,730

8 Claims. (Cl. 188—78)

This invention relates to brakes and more particularly to internal expanding brakes.

An object of the invention is to generally improve brake structures by a substantial reduction in the number of parts thereof and by simplification of the various parts in the assembly.

Another object of the invention is to provide a brake structure, the various parts of which may be stamped from sheet material, thereby reducing the cost of production.

A further object of the invention is to provide a brake structure in which the amount of required machine operation on the parts during manufacture shall be materially reduced.

Yet a further object of the invention is to provide a brake structure which is highly efficient in operation and yet of marked simplicity as a whole in respect to each of its component parts, so that its manufacture may be economically facilitated both as regards the parts and their assembly.

An important feature of the invention is a single anchor for the friction elements.

Another feature of the invention is the particular structure of the operating means.

Yet another feature of the invention is a novel adjustment member for the articulated ends of the friction elements.

Other objects and features of the invention reside in the various combinations hereinafter described and claimed as will be apparent upon reference to the following specification and to the accompanying drawings, in which:

Figure 1 is a vertical sectional view of a brake embodying the invention;

Figure 2 is a section substantially or line 2—2, Figure 1;

Figure 3 is a section substantially on line 3—3, Figure 1;

Figure 4 is a perspective view of one of the steady rests;

Figure 5 is a modification illustrating the invention as applied to a band friction element.

Figure 6 is a perspective view of the adjustment for the articulated ends of the friction elements; and Figure 7 is a top plan view of the operating means partly broken away.

Referring to the drawings for more specific details of the invention, 10 represents a stationary support such as a backing plate having associated therewith a rotatable drum 11. Positioned on the backing plate is an anchor 12 and steady rests 13 and 14. As shown, a primary shoe 15 and a secondary shoe 16 are mounted for movement on the backing plate. The primary shoe is secured against lateral movement by the steady rest 13 and the secondary shoe is secured against lateral movement by the steady rest 14.

These shoes are of the conventional type, each comprising a rim 17 and a web 18, the rim having secured thereto a suitable lining 19 adaptable for engagement with the interior of the drum. The articulated ends of the shoes are connected by a suitable adjustment device indicated generally at 20 and the separable ends of the shoes are provided with shoulders 21 and 22 embracing the anchor 12.

As shown, the shoes are connected adjacent their separable ends by a return spring 23 which normally retains the shoes in engagement with the anchor where they are supported in spaced relation to the interior of the drum.

The primary and secondary shoes 15 and 16 are interchangeable. The webs forming these shoes have at their separable ends an offset portion provided with a notch adapted to embrace the anchor and immediately adjacent the rim, the web is notched as indicated at 24 and the rim immediately adjacent the notch 24 is deformed so that it may co-operate with the notch 24 to provide a slot 25, the object of which will hereinafter appear. In this connection, it should be observed that the web of the shoe constitutes a single stamping suitably secured to the rim. However, it is to be understood that no such limitation is to be imposed in the present structure.

Mounted on the rims of the friction elements are studs 26 and positioned on the studs for rotation are rollers 27 and 28. These rollers are of different diameters, the larger rollers 28 having frictional contact with the backing plate and the smaller rollers are adapted to receive the thrust of a wedge-shaped member 29, which is held in position on the rollers 27 by the rollers 28 and the adjacent ends of the rims 17. This member is suitably secured to an operating cable 30.

As shown, a bracket 31 is secured on the backing plate as by bolts 32 and suitably secured to the bracket is a sheath 33 housing the operating cable 30 and positioned on the cable 30 between the bracket and the member 29 is a coil spring 34. This spring serves to disengage the member 29 on release of the applied force on the operating cable 30.

The adjustment device for connecting the articulated ends of the shoes comprises a stamping bent on itself to provide an envelope 35 having parallel side portions 36 and 37 and a tubular center portion 38. Two corresponding stampings having semicircular center portions 39 and flanged portions 40 and 41 are positioned for movement in the circular body portion 38 of the envelope. These stampings have oppositely diverging edges 42 and their semicircular portions are internally threaded to receive a screw 43 provided with a toothed head 44.

Positioned on the inclined edges 42 of the flanges 40 within the envelope are stampings 45. These stampings have notches 46 adaptable for the reception of a curved portion 47 on the web of the shoe, the shoes being held in engagement with the notches in the stampings 45 by a coil spring 48 connected to the shoes and bridging the adjustment member.

A modified form of the invention is illustrated in Figures 5, 6 and 7. In this illustrative embodiment of the invention, the actuating means for the friction elements is substantially the same as that shown in the preferred form, the friction elements are of the band type and the adjustment means for the articulated ends thereof is slightly modified to provide for this particular structure.

As shown, a stamping is bent on itself to provide an envelope 50 comprising parallel side portions 51 and 52 swaged at their center to provide a sleeve 53 adaptable for the reception of two corresponding plates 54 and 55.

The plates 54 and 55 are swaged so that when assembled, they provide a central sleeve 56 and the edges of the plates 54 and 55 are inclined in opposite directions as indicated at 57 and 58. The plates 54 and 55 are positioned in the envelope with the sleeve 56 in the sleeve 53. The sleeve 56 is internally threaded to receive an adjustment screw 59 provided with a square head 60 accessible through an opening 61 in the backing plate.

As shown, the respective friction elements are formed with lugs 62 and 63 and a coil spring 64 is connected between the lugs. This spring bridges the adjusting member and serves to retain the friction elements in engagement with the adjusting device. The rims of the friction elements are beveled in opposite directions and are arranged to engage the bevelled edges on the plates 54 and 55. By rotating the screw 59, the relative position of the articulated ends of the friction elements may be readily adjusted.

In operation, when a pull is exerted on the operating cable 30, force is imposed between the rollers 28 on the respective friction elements tending to spread the friction elements against the interior of the drum. Upon initial movement, the primary shoe engages the interior of the drum and a slight centrifugal action is imparted thereto by reason of the wiping action of the drum. Assuming that a proper adjustment has been made, the applied force is augmented by the wiping action of the drum and the friction elements will be effectively applied.

Although this invention has been described in connection with certain specific embodiments, the principles involved are susceptible of numerous other applications that will readily occur to persons skilled in the art. The invention is, therefore, to be limited only as indicated by the scope of the appended claims. The above-described adjustments are claimed in my divisional application No. 718,960, filed February 4, 1934.

Having thus described the various features of the invention, what I claim as new and desire to secure by Letters Patent is:

1. A brake comprising a backing plate having mounted thereon a friction element having separable ends, members mounted on said ends and having thrust engagement with the backing plate, and a member movable between the members and operable to force them apart and having a component urging them against the backing plate.

2. A brake comprising a fixed support, a friction element positioned for movement thereon having separable slotted ends, rollers positioned for rotation in the slots having a drag on the support and a wedge shaped member positioned for movement between the rollers.

3. A brake comprising a fixed support, an anchor on the support, a friction element positioned for movement on the support having oppositely disposed slots and adapted to engage the anchor, rollers positioned in the slots having a drag on the fixed support and a member movable between the rollers.

4. A brake comprising a fixed support, an anchor on the support, a friction element having separable ends engaging the anchor, rollers positioned for rotation on the separable ends having a drag on the backing plate and a wedge shaped member positioned for movement between the rollers.

5. A brake comprising a fixed support, an anchor on the support, a friction element having separable ends notched to receive the anchor, rollers on the separable ends of the friction element engaging the fixed support and a wedge shaped member movable between the rollers.

6. A brake comprising a fixed support, an anchor on the support, a friction element having separable ends notched to receive the anchor, rollers arranged in pairs on the separable ends, the rollers in each pair having different diameters, the rollers having the larger diameters engaging the fixed support and a wedge shaped member movable between the rollers having the smaller diameter.

7. A brake comprising a fixed support, an anchor positioned thereon, a friction element having separable ends notched to receive the anchor and provided with slots, rollers arranged in pairs in the slots, each pair having a small roller positioned adjacent the rim of the friction element and a large roller positioned flush against the small roller and engaging the fixed support and a wedge shaped member movable between the small rollers and guided by the rim of the friction element and the sides of the large rollers.

8. A brake comprising a fixed support, an anchor positioned thereon, a friction element movable on the support having separable ends notched to receive the anchor and provided with alined slots, rollers mounted in pairs in the slots, each pair comprising a small roller and a large roller, the small roller being flush against the rim of the friction element and the larger being flush against the smaller roller and engaging the fixed support, a bracket on the fixed support, an operating cable extending through the bracket, a wedge shaped member secured to the operating cable and movable thereby between the smaller rollers and guided by the rim of the friction element and the larger rollers and a compression member on the operating cable between the wedge shaped member and the bracket.

ROBERT F. KOHR.